United States Patent [19]

Matsko

[11] 3,940,664
[45] Feb. 24, 1976

[54] MULTI-PHASE VOLTAGE SENSING SWITCHING DEVICE

[75] Inventor: Joseph J. Matsko, Coraopolis, Pa.

[73] Assignee: Westinghouse Electric Corporation, Pittsburgh, Pa.

[22] Filed: June 24, 1974

[21] Appl. No.: 482,191

[52] U.S. Cl.......... 317/31; 317/148.5 R; 307/235 R
[51] Int. Cl.² ......................................... H02H 3/24
[58] Field of Search.......... 317/148.5 R, DIG. 5, 31; 307/235 R

[56] References Cited
UNITED STATES PATENTS

| | | | |
|---|---|---|---|
| 2,942,123 | 6/1960 | Schuh, Jr. | 317/DIG. 5 |
| 2,959,717 | 11/1960 | Conger | 317/DIG. 5 |
| 3,243,658 | 3/1966 | Blackburn | 317/DIG. 5 |
| 3,749,944 | 7/1973 | Luebrecht | 317/DIG. 5 |
| 3,843,908 | 10/1974 | Priegnitz | 317/DIG. 5 |

Primary Examiner—R. N. Envall, Jr.
Attorney, Agent, or Firm—R. E. Converse, Jr.

[57] ABSTRACT

The disclosure describes a device for detecting undervoltage conditions on multi-phase alternating current circuits which senses the voltage on the phase having the highest instantaneous positive voltage. A differential between pickup and dropout voltage is provided. Also provided is a delayed pickup following a return to normal voltage on the circuit being monitored.

12 Claims, 7 Drawing Figures

MULTI-PHASE VOLTAGE SENSING SWITCHING DEVICE

BACKGROUND OF THE INVENTION

1. Field of the Invention

The present invention relates to devices for monitoring electrical circuits and, more particularly, to devices for detecting undervoltage conditions on any phase of multiphase alternating current circuits.

2. Description of the Prior Art

Many types of commercial and industrial activity depend on electrical equipment operating from multiphase alternating current circuits. This equipment is usually designed for operation at a specified voltage and may sustain extensive damage from operation on circuits supplying less than the specified voltage. In order to prevent damage of this type it is necessary to detect undervoltage conditions on the supply circuit and to take action to correct the problem. Desirable corrective action may include actuating an alarm indicating that an undervoltage condition exists or switching from the normal power supply to an emergency power supply.

In order to fully protect equipment from damage due to undervoltage conditions it is necessary to monitor all phases of a multi-phase circuit. This has been accomplished in the past by monitoring each individual phase with an individual device. Examples of such single phase monitoring devices are set forth in U.S. Pat. Nos. 2,959,717 and 3,718,839. Use of individual monitoring devices for each phase is costly however and it would be desirable to utilize a single device to monitor voltage conditions on all phases of a multi-phase circuit.

Monitoring devices are normally designed to actuate, or "drop out", when the voltage on a circuit being monitored falls below a certain value. If the voltage being monitored should oscillate within a small range around this dropout voltage, the monitoring device may alternately actuate and deactuate, a condition known as "chattering". This condition is undesirable for it may generate multiple alarms or repeated switchover between the normal and the emergency power supply. It is therefore desirable to provide a differential between pickup and dropout voltages of the monitoring device.

Faults occurring on the power system supplying the circuits being monitored can result in rapid multiple reclosing of circuit breakers, causing alternate normal-abnormal conditions on the circuit being monitored. This also could result in multiple alarms and rapid switchover between normal and emergency supply circuits. It is desirable for a monitoring device to provide capability to ignore short transient normal conditions and to pick-up, that is, to indicate a return to normal following an abnormal condition, only after a specified time delay. It is also desirable for a monitoring device to provide capability to vary the dropout voltage with a fine degree of control.

SUMMARY OF THE INVENTION

In accordance with the present invention a voltage sensitive switching device is provided for monitoring voltage conditions on multi-phase alternating circuits. The device comprises switch means having two operational states; switch operating means, activation or deactivation of the switch operating means changing the switch means from one operational state to another operational state; rectifier means connected to each, phase of a multi-phase alternating current circuit; sensing means activating the switch operating means when the local minima of the rectified voltage of the phase having the highest instantaneous voltage passes through a first level corresponding to a first predetermined percentage of single-phase normal voltage, the sensing means deactivating the switch operating means when the local minima of the rectified voltage of the phase having the highest instantaneous voltage passes through a second level corresponding to a second predetermined percentage of single phase normal voltage. The invention also provides capacitor means operable to a charged condition when the monitoring device is in a dropped out condition. The capacitor means maintains the monitoring device in a dropped out condition even after the circuit being monitored returns to a normal voltage condition. Resistor means provide an adjustable discharge path, allowing the capacitor means to maintain the monitoring device in a dropped out condition for a variable time interval following return of the monitored circuit to normal condition.

The invention monitors voltage on all phases of a multi-phase alternating current circuit much more economically than individual voltage sensing relays on each phase. A differential is provided between pickup and dropout voltage, thereby preventing chattering. When the device is in a dropped out condition and voltage on all phases of the circuit being monitored returns to normal, a time delay is provided before the device will switch back to a pickup condition, thereby preventing undesirable rapidly alternating normal-abnormal indications. In addition, close control of pickup and dropout levels as percentages of single phase normal voltage is provided to a high resolution.

BRIEF DESCRIPTION OF THE DRAWINGS

The invention may be more readily understood when considered in view of the following detailed description of exemplary embodiments thereof, taken with the accompanying drawings, in which.

Throughout the drawings corresponding reference characters indicate corresponding parts.

DESCRIPTION OF THE PREFERRED EMBODIMENT

Figure 1:
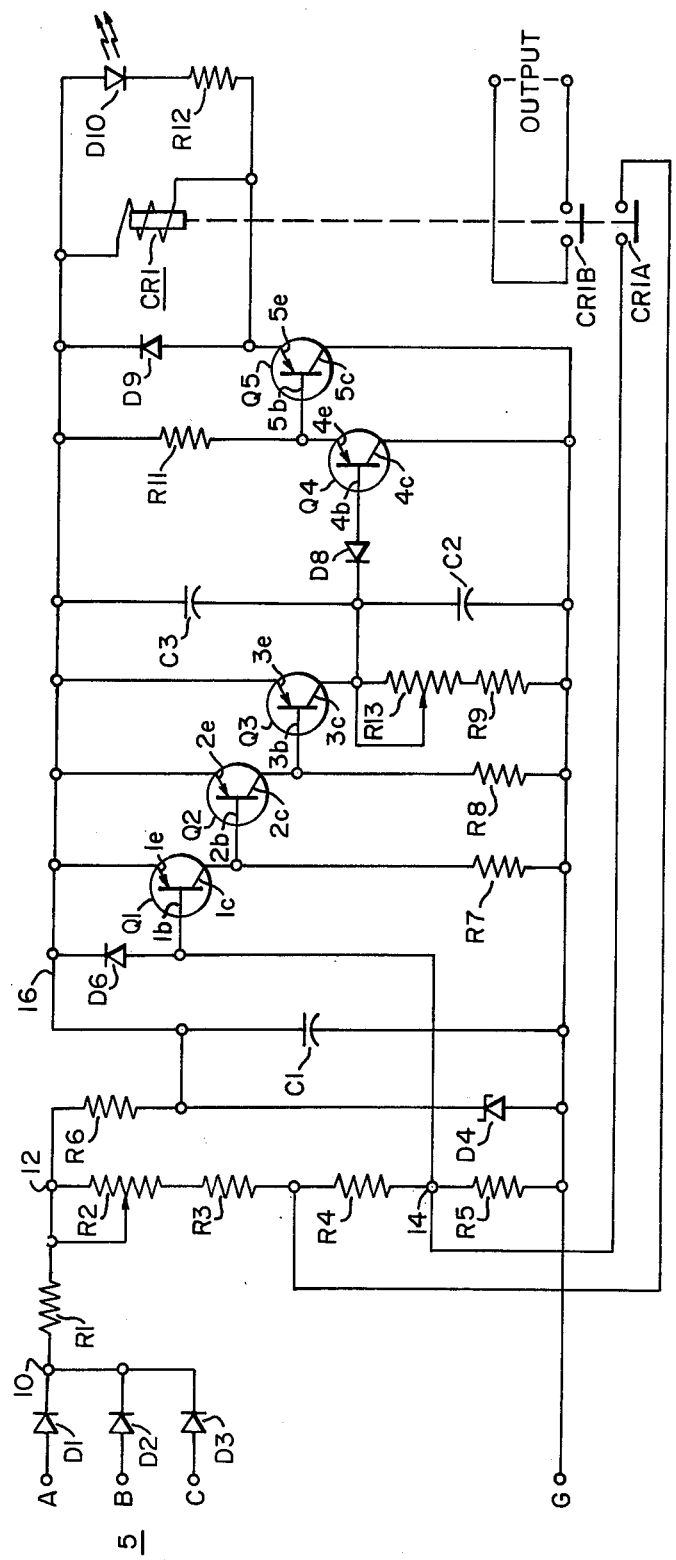
FIG. 1 is a schematic diagram of the circuit.

The three phases A, B and C of the circuit 5 being monitored are connected to the input terminals of diodes D1, D2 and D3. The output terminals of the diodes D1, D2, and D3 are connected in common to terminal 10 of a resistor R1. A voltage divider consisting of a potentiometer R2 and resistors R3, R4 and R5 is connected between a terminal 12 of the resistor R1 and a neutral line G. Also connected to the terminal 12 of the resistor R1 is a power supply consisting of a resistor R6, a Zener diode D4, and a filter capacitor C1, providing 24 volts of direct current to the remainder of the circuit through a lead 16. The base 1b of a PNP transistor Q1 is connected to the junction of the resistors R4 and R5. With its emitter 1e connected to the 24 volt direct current supply lead 16 and its collector 1c connected through the resistor R7 to ground the transistor Q1 is biased to a cut off or nonconducting condition when the voltages on phases A, B and C are normal.

Figure 2:
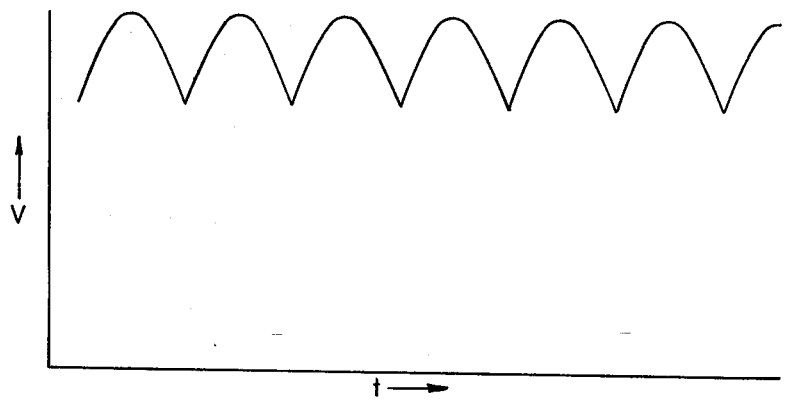
FIG. 2 shows the voltage waveform at a first point under normal conditions.
Figure 3:
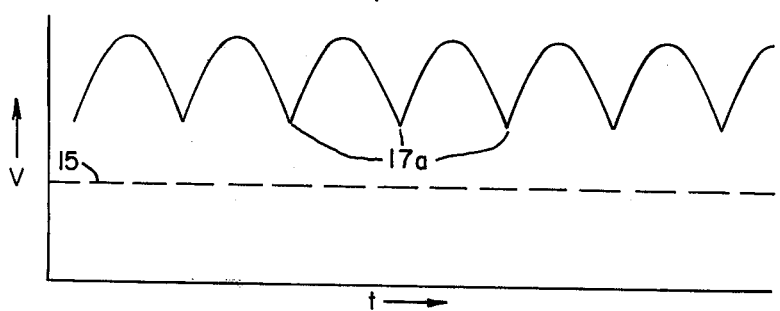
FIG. 3 shows the voltage waveform at a second point under normal conditions.

Because of the rectifying action of diodes D1, D2 and D3, the voltage at the terminal 10 is equal to the voltage of the phase having the highest instantaneous positive voltage. The waveform of this voltage under normal conditions, that is, with phases A, B and C of the circuit 5 in a normal condition, is shown in FIG. 2. At the terminal 14 the voltage waveform under the same conditions is of the same shape as the voltage waveform at terminals 10 although of a lower magnitude, as shown in FIG. 3. The potentiometer R2 and the resistors R2, R3, R4 and R5 are chosen so that under these normal conditions the voltage at the terminal 14 is at all times above the minimum voltage necessary to maintain the transistor Q1 in a nonconducting, or cut off, condition. This voltage level is indicated by the dotted line 15 in FIGS. 3, 4, 5 and 6. A transistor Q2 is connected to the output from the transistor Q1 and a transistor Q3 is connected to the output from transistor Q2. When the transistor Q1 is cut off, the transistor Q2 is saturated and the transistor Q3 is cut off. The collector 3c of the transistor Q3 is at a low potential, thus forward biasing a diode D8 connected to the collector 3c or output of the transistor Q3 and a charging a capacitor C3 to approximately 24 volts. A transistor Q4 has its base 4b connected to the anode of diode D8. A transistor Q5 has its base 5b connected to the emitter 4e of the transistor Q4. Current through the forward biased diode D8 maintains the transistors Q4 and Q5 in a saturated or conducting condition. A relay coil CR1 is thus energized, causing relay contacts CR1A and CR1B to remain closed.

Figure 4:
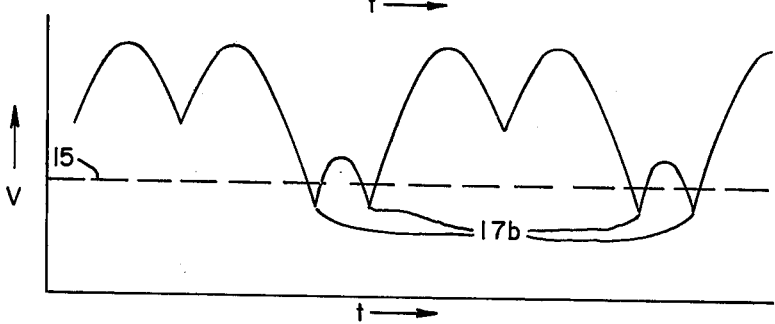
FIG. 4 shows the voltage waveform at the second point under abnormal conditions before dropout occurs.
Figure 4A:
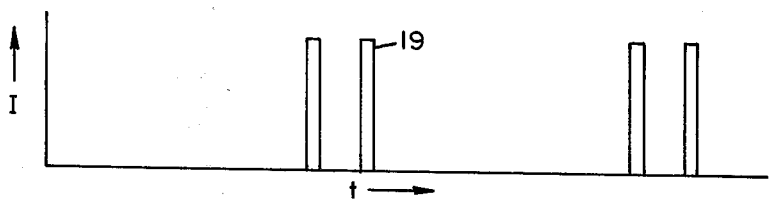
FIG. 4a shows the current through the resistor R9 under abnormal conditions.

If one of the phases A, B or C of circuit 5 should drop below normal value, the waveform at terminal 14 will be as shown in FIG. 4. Note that some of the local minima, or "valleys," indicated by the reference character 17b, of the voltage waveform are now of lesser magnitude than the corresponding valleys 17a of the voltage waveform under normal operation as shown in FIG. 3. These abnormally low voltage values at terminal 14 are sufficient to momentarily forward bias the emitter-base junction of the transistor Q1, driving the transistor Q1 into conduction. This action momentarily drives the transistor Q2 into cutoff and the transistor Q3 into conduction, producing pulses of current through resistor R9 as indicated by the reference character 19 in FIG. 4a. When the transistor Q3 is conducting, the collector 3c of the transistor Q3 rises to high potential, thus reverse biasing the diode D8. The capacitor C2 rapidly charges and the capacitor C3 discharges, maintaining a steady high potential at the collector 3c of the transistor Q3 and the reverse bias on the diode thus driving the transistors Q4 and Q5 to a nonconducting condition. The relay coil CR1 is thus deenergized, opening the relay contacts CR1A and CR1B.

Figure 5:
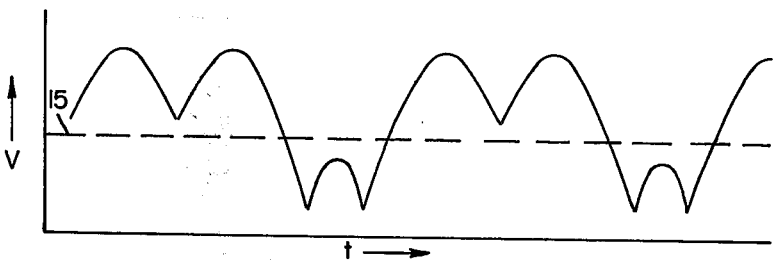
FIG. 5 shows the voltage at the second point under abnormal conditions after dropout occurs.

When the relay contact CR1A opens, the resistor R4 is inserted into the voltage divider, thus further lowering the potential at the terminal 14, as shown in FIG. 5. Thus, even if the voltage of the abnormal phase should rise slightly, the transistor Q1 will remain conducting and the relay coil CR1 will remain deenergized.

Figure 6:
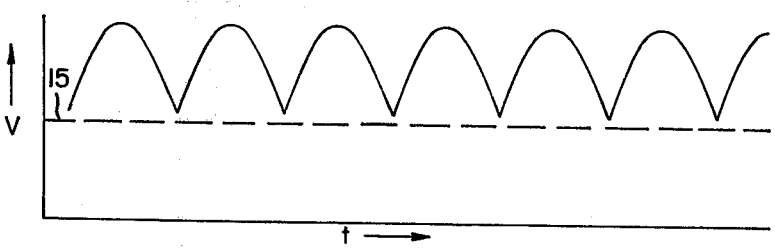
FIG. 6 shows the voltage at the second point under normal conditions before pickup occurs.

When normal conditions are re-established in the three-phase circuit 5, the voltage waveform shown in FIG. 6 is present at terminal 14. Although the voltage levels in FIG. 6 are not as high as in FIG. 3 (due to the presence of resistor R4 in the divider network) the voltage is at all times above the cut off bias level for the transistor Q1, indicated by the dotted line 15. Reverse bias is thus supplied to the emitter-base junction of the transistor Q1, driving the transistor Q1 into a nonconducting condition at all times over the alternating current cycle. The transistors Q2 and Q3 are thus driven into conducting and nonconducting conditions, respectively. The voltage at the collector 3c of the transistor Q3 does not immediately fall to a low level but begins to drop at a rate determined by the values of the capacitors C2 and C3, and the resistor R9, and by the adjustment of the potentiometer R13. When this voltage falls below the voltage on the base 4b of the transistor Q4, the diode D8 becomes formed biased, driving the transistors Q4 and Q5 into conduction. The relay coil CR1 is reenergized, closing relay contacts CR1A and CR1B, and energizing a light-emitting diode D10. The light-emitting diode is connected in series circuit relationship with the emittercollector circuit of the transistor Q5 and in parallel circuit relationship with the relay coil CR1. The relay contact CR1A shorts out the resistor R4 raising the potential at the terminal 14 and driving the transistor Q1 further into cut off. The waveform of the voltage at terminal 14 at this time is shown in FIG. 3. A time interval is thus provided between return of normal voltage on all phases and re-energization of relay coil CR1. If, during this time interval, the voltage on one phase of circuit 5 should again drop below normal, re-energization would not take place.

In order to energize the relay coil CR1 the voltage on all phases of circuit 5 must be of sufficient value to maintain the voltage at terminal 14 above the cut off level for transistor Q1 at all times during the alternating current cycle. This value of phase voltage, the pickup voltage, is determined by the adjustment of potentiometer R2, and can be expressed as a percentage of single-phase normal voltage. The phase voltage which will cause energized relay coil CR1 to deenergize is called the dropout voltage and is also a percentage of single phase normal voltage. If pickup and dropout voltages were equal CR1 would be rapidly energized and deenergized when the voltage on any phase fluctuated about the pickup-dropout voltage. This "chattering" condition is undesirable and could result in multiple alarms, rapid switchover between normal and emergency power supplies, or other unwanted actions depending on the connections made to contacts CR1B. Chattering is prevented in the present invention by the action of the relay contacts CR1A and the resistor R4, producing a differential between pickup and dropout voltage. For example, by proper choice of resistor R4 and adjustment of potentiometer R2, relay coil CR1 will become deenergized when the voltage on any phase of circuit 5 falls to 80% of the normal voltage. The relay coil CR1 will remain deenergized until the voltage on the malfunctioning phase rises once again to 90% of normal voltage condition, providing a 10% differential between pickup and dropout voltage.

The relay contact CR1B may be used to actuate an alarm signifying low voltage on at least one phase. It could also be used to actuate a transfer switch disconnecting electrical equipment from the utility company supply and connecting it to a standby power source. A failure of the utility company supply caused by tripping of breakers in response to a fault is often followed by multiple reclosures of the breakers before the fault is cleared. This would result in multiple actuation of a transfer switch connected to CR1B from normal to standby positions if time delay standby-to-normal capability were not provided. Prior art devices have used a separate time delay relay for this function. The present invention provides this capability at much lower cost through the action of the capacitor C3 and the resistor R13. By proper adjustment of the resistor R13 the voltage at the collector 32 of the transistor Q3 can be held above the level required to render conducting the transistors Q4 and Q5. This maintains relay coil CR1 in a de-energized condition for a suitable length of time after all phases of circuit 5 have risen above pickup level, thus insuring that circuit 5 is once more in a stable normal condition before pickup occurs.

The diodes D6 and D9 serve to protect transistors Q1 and Q5 from voltage transients on the 24 volt lead 16. The resistor R12 limits the current through the light-emitting diode D10 to a safe level.

It can be seen that sensing means consisting of a voltage divider formed by R2, R3, R4, and R5 and biasing means consisting of the semiconductor current supply means Q1, Q2, and Q3 detect low voltage from a signal supplied by the semiconductor diode rectifiers D1, D2, and D3 connected to the circuit being monitored. The output of the sensing means actuates switch operating means consisting of the semiconductor switch Q4 and Q5 and the relay coil CR1. Energization of the relay coil CR1 actuates the switch means consisting of relay contacts CR1B.

The described embodiment monitors a three-phase alternating current circuit; however, the invention could be constructed to monitor a circuit having a greater number of phases by connecting one diode similar to diodes D1, D2 and D3 between each additional phase and terminal 10. The invention monitors the voltage at the terminal 10, which is the rectified voltage of the phase having the highest instantaneous voltage and deenergizes relay coil CR1 when the the local minima of this voltage fall below a level corresponding to dropout voltage, a percentage of single phase normal voltage.

If desired, the differential between pickup and dropout voltage could be made variable by replacing the resistor R4 with a variable resistor. In addition semiconductor switches or other switch means and switch operating means could be substituted for the contacts CR1A and CR1B and for the relay coil CR1. The voltage divider consisting of R2, R3, R4 and R5 could be replaced with other types of sensing means such as a differential amplifier circuit. Various other systems could also be used with the invention; therefore while the invention has been described with reference to particular embodiments it is to be understood that modifications may be made without departing from the spirit of the invention or from the scope of the claims.

I claim:

1. A voltage sensitive switching device for monitoring conditions on multi-phase alternating current circuits, said device comprising:

a. switch means having two operation states,
   b. switch operating means, activation or deactivation of said switch operating means changing said switch means from one operational state to another operational state,
   c. rectifier means having an input and an output, said input connectable to each phase of a multi-phase alternating current circuit,
   d. sensing means connected to said output of said rectifier means for activating said switch operating means when the local minima of the rectified voltage of the phase having the highest instantaneous voltage passes through a first level corresponding to a first predetermined percentage of single phase normal voltage, said sensing means deactivating said switch operating means when the local minima of the rectified voltage of the phase having the highest instantaneous voltage passes through a second level corresponding to a second predetermined percentage of single phase normal voltage.

2. A device as claimed in claim 1 wherein said switch means comprises at least one pair of relay contacts and said switch operating means comprises a relay coil.

3. A device as claimed in claim 2 wherein said switch operating means further comprises semiconductor switching means having two operational states, one of said semiconductor switching means operational states energizing said relay coil and the other of said semiconductor switching means operational states deenergizing said relay coil.

4. A device as claimed in claim 1 wherein said rectifier means comprises a plurality of semiconductor diodes having input and output terminals, the input terminal of each semiconductor diode being adapted for connection to one phase of a multi-phase alternating current circuit and the output terminals of all semiconductor diodes being connected in common.

5. A device as claimed in claim 3 wherein said sensing means comprises voltage divider means connected to said output of said rectifier means, and biasing means causing said semiconductor switching means to change from one operational state to another operational state when the rectified voltage of the phase having the highest instantaneous voltage falls below said first level corresponding to a first predetermined percentage of single phase normal voltage, said biasing means also causing said semiconductor switching means to change from one operational state to another operational state when the rectified voltage of the phase having the highest instantaneous voltage of all phases rises above said second level corresponding to a second predetermined percentage of single phase normal voltage.

6. A device as claimed in claim 5 wherein said biasing means comprises semiconductor current supply means producing a direct current when the rectified voltage of the phase having the highest instantaneous voltage of all phases is below said first level corresponding to said first predetermined percentage of single phase normal voltage, said biasing means comprising capacitor means, said capacitor means being charged by said direct current to maintain bias voltage to operate said semiconductor switching means to a non-conducting condition.

7. A device as defined in claim 1 comprising means for providing a differential between said first level and said second level, said differential means comprising a single voltage divider and means controlled by said switch operating means for changing the resistance of a portion of said voltage divider.

8. A device as recited in claim 7 wherein said resistance changing means comprises means for short circuiting a portion of said voltage divider.

9. A device as recited in claim 8 wherein said switch operating means comprises a relay coil, said switch means comprises a first pair of relay contacts, and said short circuiting means comprises a second pair of relay contacts connected in parallel with a portion of said voltage divider.

10. A voltage sensitive switching device for monitoring conditions on multi-phase alternating current circuits, said device comprising:
   a. switch means having two operational states,
   b. switch operating means, activation or deactivation of said switch operating means changing said switch means from one operational state to another operational state,
   c. rectifier means having an input and an output, said input connectable to each phase of a multi-phase alternating current circuit,
   d. sensing means connected to said output of said rectifier means for activating said switch operating means when the rectified voltage of the phase having the highest instantaneous voltage passes through a first level corresponding to a first predetermined percentage of single phase normal voltage, said sensing means deactivating said switch operating means when the rectified voltage of the phase having the highest instantaneous voltage passes through a second level corresponding to a second predetermined percentage of single phase normal voltage, and
   e. means for providing a differential between said first level and said second level, said differential means comprising a single voltage divider and means controlled by said switch operating means for changing the resistance of a portion of said voltage divider.

11. A voltage sensitive switching device as recited in claim 10 wherein said resistance changing means comprises means for short circuiting a portion of said voltage divider.

12. A voltage sensitive switching device as recited in claim 11 wherein said switch operating means comprises a relay coil, said switch means comprises a first pair or relay contacts, and said short-circuiting means comprises a second pair of relay contacts connected in parallel with a portion of said voltage divider.

* * * * *